United States Patent Office
3,812,152
Patented May 21, 1974

3,812,152
NOVEL DIBENZOFURAN AND DIBENZO-
THIOPHENE DERIVATIVE
Kurt Hofer, Muenchenstein, Basel-Land, and Anton
Voykowitsch, Binningen, Basel-Land, Switzerland, assignors to Sandoz Ltd., Basel, Switzerland
No Drawing. Filed Mar. 11, 1971, Ser. No. 123,397
Claims priority, application Switzerland, Mar. 13, 1970,
3,754/70
Int. Cl. C07d 63/24, 5/44
U.S. Cl. 260—329.3    14 Claims

ABSTRACT OF THE DISCLOSURE

This invention is directed to new heterocyclic compounds for stabilizing organic materials. The basic structural unit of these compounds is dibenzofuran or dibenzothiophene, to which at least one alkyl-substituted phenol group is bound through a methylene bridge.

---

This invention is directed to new heterocyclic compounds for stabilizing organic materials. The basic structural unit for these compounds is dibenzofuran or dibenzothiophene, to which at least one alkyl-substituted phenol group is bound through a methylene bridge.

The invention thus relates to new heterocyclic compounds of formula

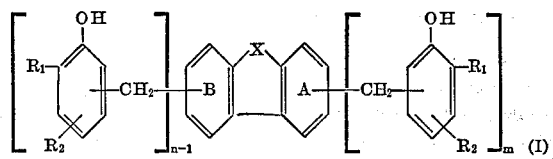

where the two benzene nuclei A and B may bear substituted or unsubstituted alkyl radicals, the index $m$ stands for 1 or 2, the index $n$ for 1, 2 or 3, the substituent X for oxygen or sulphur, $R_1$ for tertiary alkyl having 4 to 8 carbon atoms and $R_2$ for hydrogen, substituted or unsubstituted alkyl or cycloalkyl.

$R_1$ in formula (I) may represent, for example, tert. butyl, tert. amyl or 1,1,3,3-tetramethylbutyl.

Examples of optionally substituted alkyl radicals which may be present as $R_2$ or on the benzene nuclei A and B are methyl, ethyl, n-propyl, iso-propyl, n-butyl, iso-butyl, sec. butyl, tert. butyl, n-amyl, sec. amyl, iso-amyl, tert. amyl, n-hexyl, n-heptyl, n-octyl, 2-octyl, 2-ethylhexyl, tert. octyl, tert. nonyl, n-decyl, n-dodecyl, tert. dodecyl, n-tetradecyl, cetyl, stearyl, behenyl, trifluoromethyl, 2,2-difluorethyl, 2-cyanethyl, 2-methoxyethyl, 2-ethoxyethyl, 2-n-butoxyethyl, 3-methoxypropyl, 2-(2' - ethoxyethoxy)-ethyl, 2-(2'-n-butoxyethoxy)-ethyl, 2 methylthioethyl, 3 methylthiopropyl and tetrahydrofurfuryl. The alkyl radicals are preferred, which, together with the substituents which may be present, contain not more than nine carbon atoms.

The substituent $R_2$ in the meaning of cycloalkyl may be, e.g. cyclopentyl, cycloheptyl or in particular cyclohexyl radicals, either substituted or unsubstituted, such as cyclohexyl itself, 4-methylcyclohexyl, 2,5-, 2,6-, 3,4- and 3,5-dimethylcyclohexyl.

Among the preferred compounds of the present invention are those of the formula

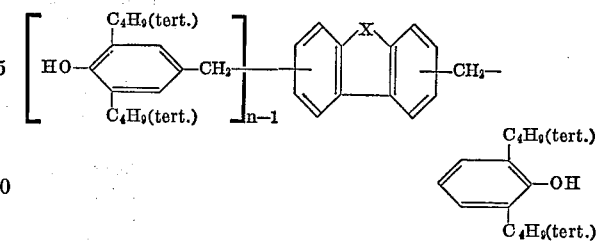

where $n$ stands for 1, 2, or 3 and X represents oxygen or sulphur.

The invention relates further to a process for the production of new heterocyclic compounds of formula (I). It consists in combining, by known methods, 1 mole of a compound of formula

with $m+(n-1)$ moles of a compound of formula

through a methylene bridge.

The process for the production of compounds of formula (I) can be effected in three different ways: the condensation in the presence of an acid catalyst of 1 mole of a compound of formula (II) with $m+(n-1)$ moles of a compound of formula

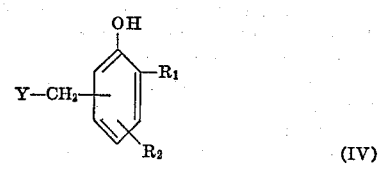

where Y represents halogen, HO or lower alkoxy; the condensation of 1 mole of a compound of formula

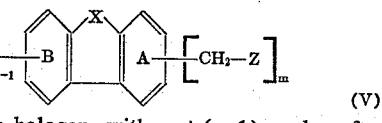

where Z represents halogen, with $m+(n-1)$ moles of a compound of formula (III); or the condensation of 1 mole of a compound of formula (V) with $m+(n-1)$ moles of a compound of formula

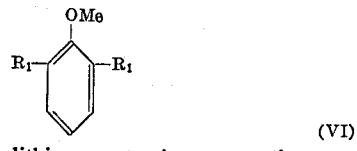

where Me represents lithium, potassium or sodium.

If the substituents Y and Z in the starting materials of formulae (IV) and (V) signify halogen they may be bromine but are preferably chlorine.

If Y in formula (IV) stands for lower alkoxy it may be, for instance, ethoxy, iso-propoxy, tert. butoxy or in particular methoxy.

In the condensation of a compound of formula (II) with a compound of formula (IV) hydrogen halide, water or a lower alcohol is split off, according to whether Y represents halogen, HO or lower alkoxy. The suitable acid condensing agents or acid catalysts include sulphuric, phosphoric and polyphosphoric acids, hydrogen fluoride and, particularly in cases where Y represents halogen, Lewis acids and Friedel-Crafts catalysts such as aluminium chloride, borofluoride, tin tetrachloride, gallium bromide and zinc chloride.

The two intermediates for condensation are preferably dissolved in an inert solvent such as carbon disulphide, nitrobenzene, dichlorethene, trichlorethylene or chlorobenzene, and the condensing agent added slowly to the solution. The reaction is commenced at a low temperature and if necessary brought to completion by heating. Temperatures of about —20° to 150°, preferably —10° to 100°, are employed. The condensing agent can be destroyed and the reaction thus finalized by the addition of ice or water. The product is worked up as in the other known Friedel-Crafts alkylation reactions.

The condensation reaction of a compound of formula (V) with one of formula (III) is carried out in essentially the same way, except that a catalyst may be added or not.

In contrast to the above two condensation reactions, the condensation of a compound of formula (V) with a compound of formula (VI) is accomplished under alkaline conditions. This reaction is preferred when the phenol derivative for condensation has tertiary alkyl radicals in both ortho-positions of the phenolic hydroxyl group. It is best carried out in an excess of the alkaline salt of a 2,6-di-tert. alkylphenol in a polar, aprotic solvent such as formamide, dimethyl formamide, dimethyl acetamide, a nitrated hydrocarbon such as nitromethane, nitroethane or nitrobenzene, or a nitrile such as aceto-, propio- or benzo-nitrile in the absence of oxygen and water. The halomethyl compound of formula (V) is added slowly to the dissolved alkyl phenolate and condensed at about 30° to 300°, preferably at 50° to 150°, which gives rise to alkali halide as by-product.

The new heterocyclic compounds can be isolated in the pure form or as a crude mixture consisting of the isomers or of a mixture of compounds which differ from each other by the number of phenolic radicals bound to the heterocyclic base structure. In many cases these mixtures are better soluble in organic materials than the pure homogeneous active substances. This can be of advantage for the application.

This invention relates further to the use of the new heterocyclic compounds of formula (I) for the stabilization of organic materials against the effects of heat, oxidation, visible and ultraviolet radiation.

The compounds of formula (I) are suitable for use as stabilizers, either alone or in combination with known stabilizers such as sterically hindered phenols, e.g. 2,6-di-tert. butyl-4-methyl-phenol, and thio compounds, e.g. dilaurylthiodipropionate.

The organic materials which can be protected with the disclosed compounds include vegetable oils, refined petroleum oils, natural and synthetic macromolecular substances such as wool, silk, rubber, synthetic elastomers, cellulose, cellulose derivatives, polyesters, polyamides, polyacrylonitrile, polyvinyl chloride, polyvinyl esters, polystyrene, polyethylene and polypropylene. These substances may be present in the form of fim or sheeting, tapes, fibres, granules, powders, coatings, flat or circular extrusion moulded products, in other processing forms, or as solutions, emulsions or dispersions.

The present invention also extends to the organic materials which contain one or more compounds of formula (I) serving for protection against heat, oxidation, visible light and ultraviolet radiation.

These compounds can be incorporated in the said materials at any stage of processing using standard methods, and in amounts which may vary within wide limits, e.g. from 0.01 to 5% or preferably 0.05 to 1.0% relative to the weight of the organic material.

In comparison with the nearest comparable known compounds of formulae

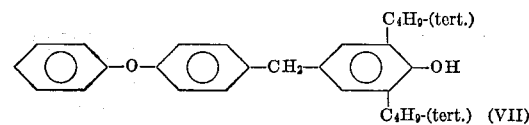

(VII)

and

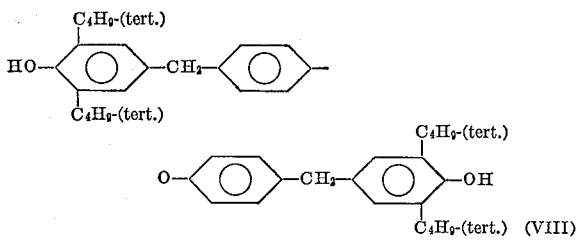

(VIII)

the new compounds of formula (I) are considerably more effective as costabilizers for mineral oil and polypropylene, for instance in combined application with the stabilizers dilauryl thiodipropionate or trinonylphosphite.

In the following Examples the parts and percentages are by weight and the temperatures in degrees centigrade.

EXAMPLES OF THE PRODUCTION

Example 1

In a nitrogen atmosphere in the absence of moisture 34 parts of diphenylene oxide (dibenzofuran) and 114 parts of 2,6-bis-tert.-butyl-4-chloromethylphenol are dissolved in 300 parts of benzin (boiling range 100–120°). Subsequently 0.3 parts of zinc chloride are added with stirring. The solution is held at 70–80° for 5 hours. The condensation product is isolated by dilution with toluene, washed with water until neutral, and freed from the organic solvent by vacuum distillation. Recrystallization of the crude product from iso-propanol yields the pure, colorless 1,3,8-tris-(3′,5′-di-tert.-butyl-4′-hydroxybenzyl)-dibenzofuran of formula

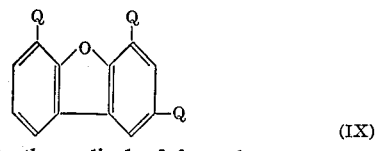

(IX)

where Q represents the radical of formula

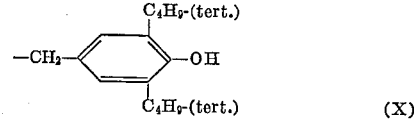

(X)

This compound melts at 159.5–160.5°.

EXAMPLE 2

25.2 parts of dibenzofuran and 75 parts of 3,5-di-tert.-butyl-4-hydroxybenzylmethylether are dissolved in 250 parts of dichloromethane at room temperature and the solution cooled to 0°. In one hour 60 parts of 80% sulphuric acid are added with stirring, then stirring is continued for another hour. After the addition of ice and water the organic phase is separated and washed with water until neutral, after which the solvent is distilled with vacuum. A crystalline residue remains, from which 3,6 - bis - (3′,5′-di-tert.-butyl-4′-hydroxybenzyl)-dibenzofuran is isolated by re-crystallization from ethanol. This compound melts at 186–187°.

EXAMPLE 3

44.8 parts of tert.-butyl-dibenzofuran and 47.4 parts of 3,5-di-tert.-butyl-4-hydroxybenzyl alcohol are dissolved in 300 parts of dichloromethane and reacted as described in Example 2, using 40 parts of 80% sulphuric acid as condensing agent. After working up 85 parts of a pale yellow viscous oil are obtained. It consists of an isomeric mixture of dibenzofurans which contain a tert.-butyl radical in one benzene ring and a 3,5-di-tert.-butyl-4-hydroxybenzyl radical in the other.

The starting tert.-butyl-dibenzofuran used here can be obtained as follows. Dibenzofuran is alkylated with tert.-butylchloride in the presence of aluminium chloride in the normal way, the product isolated and distilled in high vacuum. At 0.002 torr. and 78° a colorless oil distills which consists of 1-tert.-butyl-dibenzofuran and 3-tert.-butyl-dibenzofuran in the approximate weight ratio of 1:3.

EXAMPLE 4

13.3 parts of 3-heptyl-dibenzofuran and 10 parts of 5-methyl-3-tert.-butyl-2-hydroxybenzyl alcohol are dissolved in 70 parts of dichloroethane and condensed in the presence of 10 parts of 80% sulphuric acid by the method described in Example 2. On isolation of the product 21 parts of a yellow viscous oil are obtained, which consists in the main of a dibenzofuran which bears in one benzene ring the heptyl radical and in the other benzene ring the 5-methyl-3-tert.-butyl-2-hydroxybenzyl radical.

EXAMPLE 5

30 parts of chloromethylated dibenzofuran are dissolved with 52 parts of 2-tert.-butyl-4-methylphenol in 50 parts of chlorobenzene.

The solution is maintained for 36 hours at 60° and diluted with chlorobenzene, washed with water and then with sodium hydrogen carbonate solution. After distillation of the solvent the unreacted starting material is eliminated by heating at 200° with vacuum. A yellowish oil consisting of dibenzofuran substituted one to three times by the 5-methyl-3-tert.-butyl-2-hydroxy-benzyl radical is obtained in a yield of 45 parts.

The chloromethylated dibenzofuran used as starting material in this reaction can be prepared as follows. A mixture of 50 parts of dibenzofuran, 15 parts of paraformaldehyde, 1 part of zinc chloride and 48 parts of thionyl chloride is reacted at 40° to yield, after isolation, 67.3 parts of a mixture of chloromethyl compounds which contains 18.4% chlorine and includes still small amounts of dibenzofuran.

EXAMPLE 6

35 parts of 2.6-di-tert.-butylphenol are dissolved in 100 parts of anhydrous dimethyl formamide under nitrogen, and 11 parts of sodium methylate are added to the solution. The temperature is increased to 140° to remove the methanol, then the solution is cooled to 60°. A solution of 30 parts of chloromethylated dibenzofuran (prepared as given in Example 5) in 60 parts of dimethyl formamide is added slowly with stirring. The reaction is complete after 4 hours at 60–70°. On cooling, the reaction mixture is run into water and the precipitated crude product collected, dissolved in toluene and washed with water until of neutral reaction. The solvent is removed by distillation and the unreacted starting material by heating at 170° with vacuum. 59 parts of a highly viscous yellowish oil are obtained. It consists of a mixture of dibenzofurans substituted one, two and three times by the 3,5-di-tert.-butyl-4-hydroxybenzyl radical.

EXAMPLE 7

18.4 parts of dibenzothiophene and 23.6 parts of 3,5-di-tert-.butyl-4-hydroxybenzyl alcohol are dissolved in 150 parts of dichloromethane and reacted with 20 parts of 80% sulphuric acid as described in Example 2. The product is isolated and recrystallized from butanol. It is 3-(3',5'-di-tert.-butyl - 4' - hydroxy) - benzyldibenzothiophene which melts at 188°.

EXAMPLE 8

64 parts of 3,5-di-tert.-butyl-4-hydroxybenzyl chloride and 20.8 parts of dibenzothiophene are dissolved in 300 parts of cyclohexane, with the subsequent addition of 1 part of tin tetrachloride and 0.5 parts of zinc chloride. The mixture is reacted for 20 hours at 75°. After isolation the product is washed with sodium bicarbonate and water, dried and freed from solvent by distillation. The residue is recrystallized from n-propanol with the aid of animal charcoal. The procedure results in 3,6-bis-(3',5'-di-tert.-butyl-4'-hydroxy)-benzyl-dibenzo-thiophene with melting point 165°.

EXAMPLE 9

27.6 parts of dibenzthiophene and 47.4 parts of 3,5-di-tert.-butyl-4-hydroxybenzyl alcohol are dissolved in 250 parts of dichloromethane and reacted with 40 parts of 80% sulphuric acid as described in Example 2. After isolation and working up, 70 parts of a mixture of 3-mono- and 3,6-bis-substituted dibenzothiophene are obtained in the form of colorless crystals; the substituent is 3,5-di-tert.-butyl-4-hydroxybenzyl radical.

EXAMPLE 10

14.1 parts of 3-heptyl-dibenzothiophene and 10 parts of 5-methyl-3-tert.-butyl-2-hydroxybenzyl alcohol are dissolved in 80 parts of dichloromethane and reacted with 10 parts of 85% sulphuric acid as described in Example 2. The product is worked up as given in that Example. A viscous yellowish oil is obtained which consists predominantly of a dibenzothiophene whose one benzene ring is substitute in 3-position by the heptyl radical and whose other benzene ring is substituted in the 6-position by the 5-methyl-3-tert.-butyl-2-hydroxybenzyl radical.

EXAMPLES FOR THE APPLICATION

Example A

*Paraffin oil*, alone or in mixture with one or more stabilizers is de-aerated and stored in a closed system under oxygen. The temperature is then increased to 190°, which creates an excess pressure of approximately 20 mm. Hg. Oxidation of the paraffin oil causes a fall in pressure. The speed of the pressure decrease is low if the effectiveness of the stabilizer or stabilizer mixture is high.

With every sample the time which elapses before the excess pressure sinks to zero is determined. The following times were measured:

(a) mineral oil with iron powder, without stabilizer: 20 minutes.
(b) mineral oil with iron powder and 0.1% each of 2,6-di-tert.-butyl-4-methylphenol, dilaurylthiodipropionate and trinonylphenyl phosphite: 132 minutes.
(c) mineral oil as in b, containing additionally 0.1% of the compound of formula (IX): 540 minutes.

Example B

The stabilizing action on polypropylene was determined by the test method of German Industrial Standard 53381, Sheet 3, which is described in the journal "Kunststoffe," 55, 660 (1965):

A current of air is directed over a polypropylene sample heated to 198° and then into a 0.1 normal potassium chloride solution. The acids formed by atmospheric oxidation under the action of the heat, which are a measure of the degradation of the polypropylene, cause a reduction in the pH of the potassium chloride solution.

The time taken for the pH to fall to 4.6 is measured in minutes. The following values were obtained:

(d) polypropylene without stabilizer: 9 minutes.
(e) polypropylene with 0.1% each of 2,6-di-tert.-butyl-p-cresol, dilaurylthiodipropionate and trinonylphenyl phosphite: 26 minutes.
(f) polypropylene as in e. containing additionally 0.1% of the compound of formula (IX): 120 minutes.

Example C

Polypropylene powder is homogeneously mixed with stabilizers. The mixture is rolled during five minutes at 180° and then pressed to a film of one mm. thickness. These films are aged rapidly at 140° in an air oven. The results were as follows:

| Number of the example | Stabilizer | Brittle after ? hours | Color after 670 hours |
|---|---|---|---|
| | Without stabilizers | 3 | |
| | 2,6-ditert-butyl-4-methylphenol | 20 | |
| | Compound of formula (VII) | 96 | Brown. |
| | Compound of formula (VIII) | 1,170 | Do. |
| 1 | Compound of formula (IX) | 1,250 | Yellow. |
| 7 | 3-(3',5'-di-tert.-butyl-4'-hydroxy)-benzyl-dibenzothiophene. | 960 | Light yellow. |
| 8 | 3,6-bis-(3'-5'-di-tert.-butyl-4'-hydroxy)-benzyl-dibenzothiophene. | 1,300 | Do. |
| 9 | Mixture of 3-mono and 3,6-bis-substituted dibenzothiophene. | 1,050 | Do. |

Example D

From films, made as described in Example C, disks of a diameter of 18 mm. are punched. These are stored under oxygen as described in Example A. The results were as follows:

| Number of the example | Stabilizer | Decrease of the pressure to zero in minutes |
|---|---|---|
| | 2,6-di-tert-butyl-4-methylphenol | 25 |
| 1 | Compound of formula (IX) | 70 |
| 5 | Mixture of substituted dibenzofuranes | 68 |
| 7 | 3-(3',5'-di-tert.-butyl-4'hydroxy)-benzyl-dibenzothiophene. | 54 |
| 8 | 3,6-bis-(3'-5'-di-tert.-butyl-4'-hydroxy)-benzyldibenzothiophene. | 77 |
| 9 | Mixture of 3-mono and 3,6-bis-substituted dibenzothiophene. | 90 |

Analogous tests have shown that the compounds described in Examples 2 to 10 are equally effective stabilizers for paraffin oil, polyolefins and polyvinyl chloride.

Formulae of representative stabilizers of the foregoing Examples are as follows:

EXAMPLE 1

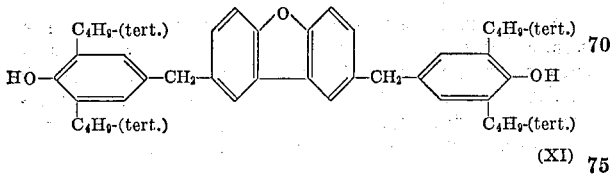

where Q represents the substituent of formula

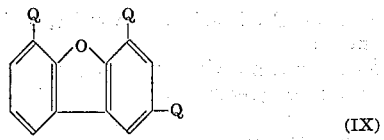

EXAMPLE 2

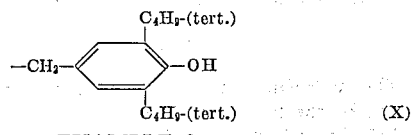

EXAMPLE 7

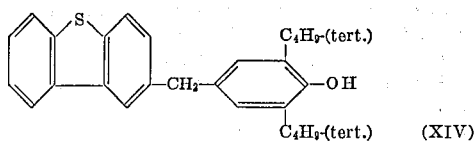

EXAMPLE 8

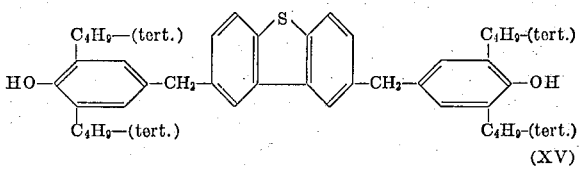

EXAMPLE 10

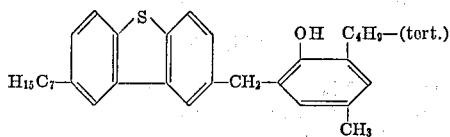

Having such disclosed the invention what is claimed is:

1. A compound of the formula

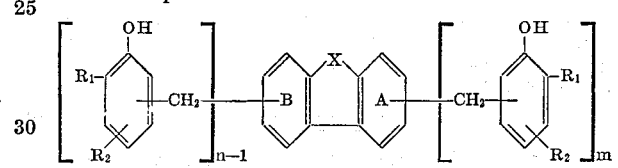

wherein the nuclei A and B may bear substituted or unsubstituted alkyl of 1 to 22 carbon atoms
$m$ is 1 or 2;
$n$ is 1, 2 or 3;
X is oxygen or sulphur;
$R_1$ is tertiary alkyl having 4 to 8 carbon atoms; and
$R_2$ is hydrogen, substituted or unsubstituted alkyl of 1 to 22 carbon atoms or cycloalkyl which may be substituted by 1 or 2 methyl groups;

provided that any substituted alkyl group is tetrahydrofurfuryl or alkyl substituted by fluoro, cyano, alkoxy of up to 4 carbon atoms, alkoxyalkoxy of up to 6 carbon atoms, or methylthio and further provided that any substituted or unsubstituted cycloalkyl is cyclopentyl, cyclohexyl or cycloheptyl.

2. A compound according to claim 1 wherein any substituted or unsubstituted alkyl group contains a total of no more than 9 carbon atoms.

3. A compound according to claim 1 wherein $R_2$ is hydrogen or alkyl containing no more than 9 carbon atoms, and $m$ is 1.

4. A compound according to claim 3 wherein X is oxygen.

5. A compound according to claim 3 wherein X is sulphur.

6. A compound according to claim 2 wherein $R_2$ is hydrogen or unsubstituted alkyl and any substituents on the nuclei A and B other than the hydroxybenzyl groups are unsubstituted alkyl.

7. A compound according to claim 3 of formula

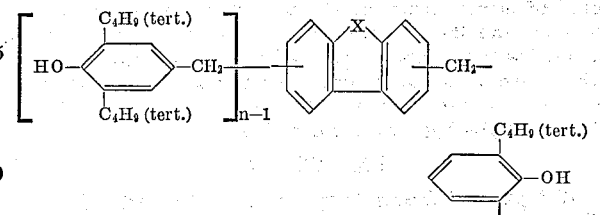

where $n$ stands for 1, 2 or 3 and X represents oxygen or sulphur.

8. A compound according to claim 2 of formula

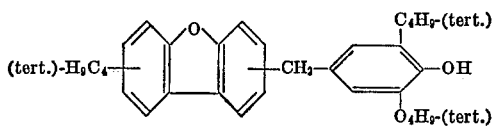

9. A compound according to claim 2 of formula

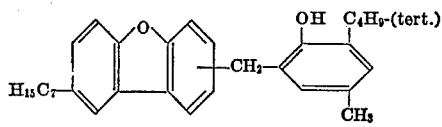

10. A compound according to claim 3 of formula

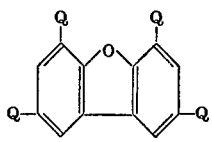

where Q represents the substituent of formula

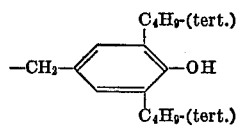

11. A compound according to claim 2 of formula

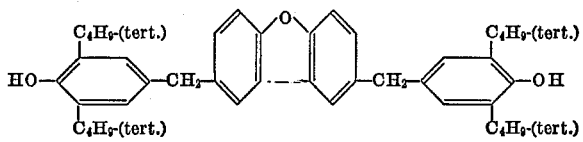

12. A compound according to claim 2 of formula

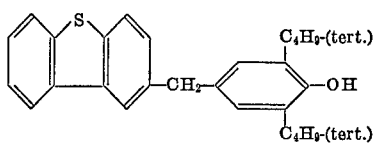

13. A compound according to claim 3 of formula

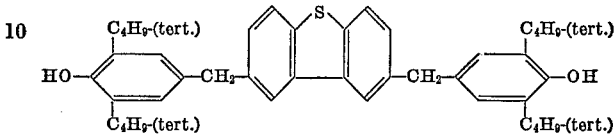

14. A compound according to claim 2 of formula

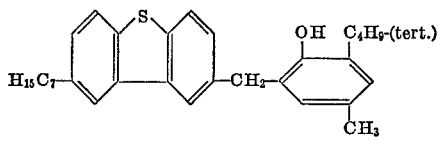

References Cited
UNITED STATES PATENTS
3,218,337  11/1965  McCall et al. _____ 260—329.3

JOHN D. RANDOLPH, Primary Examiner
C. M. S. JAISLE, Assistant Examiner

U.S. Cl. X.R.

8—128 R; 252—48.2, 48.4, 52, 54, 404; 260—45.8, 346.2 M, 814

UNITED STATES PATENT OFFICE
CERTIFICATE OF CORRECTION

Patent No. 3,812,152  Dated May 21, 1974

Inventor(s) HOFER AND VOYKOWITSCH

It is certified that error appears in the above-identified patent and that said Letters Patent are hereby corrected as shown below:

Column 1 - In the Title - delete [DERIVATIVE] and insert the following:

--- DERIVATIVES ---

Signed and sealed this 8th day of October 1974.

(SEAL)
Attest:

McCOY M. GIBSON JR.
Attesting Officer

C. MARSHALL DANN
Commissioner of Patents